(12) United States Patent
Yamamoto

(10) Patent No.: US 11,588,564 B2
(45) Date of Patent: Feb. 21, 2023

(54) RECEIVING DEVICE

(71) Applicant: Panasonic Intellectual Property Management Co., Ltd., Osaka (JP)

(72) Inventor: Masataka Yamamoto, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 16/996,376

(22) Filed: Aug. 18, 2020

(65) Prior Publication Data

US 2021/0058176 A1 Feb. 25, 2021

(30) Foreign Application Priority Data

Aug. 20, 2019 (JP) .............................. JP2019-150518

(51) Int. Cl.
| | | |
|---|---|---|
| *H04H 40/27* | (2008.01) | |
| *H04H 20/86* | (2008.01) | |
| *G06F 3/16* | (2006.01) | |
| *G10K 15/02* | (2006.01) | |

(52) U.S. Cl.
CPC ............ *H04H 40/27* (2013.01); *G06F 3/165* (2013.01); *G10K 15/02* (2013.01); *H04H 20/86* (2013.01); *H04H 2201/18* (2013.01)

(58) Field of Classification Search
CPC .... H04H 40/27; H04H 20/86; H04H 2201/18; H04H 20/22; H04H 20/26; G06F 3/165; G06F 3/162; G10K 15/02
See application file for complete search history.

(56) References Cited

U.S. PATENT DOCUMENTS

2012/0316663 A1* 12/2012 Sasanabe ............... H04H 20/22
700/94

FOREIGN PATENT DOCUMENTS

| JP | 2012-191490 | 10/2012 |
|---|---|---|
| WO | 2011/102144 | 8/2011 |

* cited by examiner

*Primary Examiner* — Ankur Jain
(74) *Attorney, Agent, or Firm* — Greenblum & Bernstein, P.L.C.

(57) ABSTRACT

A receiving device including a first electronic component and a second electronic component. The first electronic component includes: an analog audio demodulator that demodulates a received signal including a digital broadcast wave and an analog broadcast wave to output an analog audio, the analog broadcast wave being broadcast later by a preset first delay time than the digital broadcast wave; and a transmitter that transmits a communication signal including the analog audio and the received signal to the second electronic component. The second electronic component includes: a receiver that receives the communication signal from the transmitter; a digital audio demodulator that demodulates the received signal included in the communication signal to output a digital audio; and a selector that selects at least one of the digital audio and the analog audio as an output sound signal.

14 Claims, 4 Drawing Sheets

RECEIVING DEVICE

CROSS-REFERENCE TO RELATED APPLICATIONS

This application is based upon and claims the benefit of priority from Japanese Patent Application No. 2019-150518, filed on Aug. 20, 2019, the entire contents of which are incorporated herein by reference.

FIELD

Embodiments described herein relate generally to a receiving device.

BACKGROUND

In North America, terrestrial radio broadcasting is called HD Radio. HD Radio employs the in-band on-channel (IBOC) standard. According to the IBOC standard, an analog broadcast wave and a digital broadcast wave are transmitted. The analog broadcast wave is modulated using an amplitude modulation (AM) scheme or a frequency modulation (FM) scheme and the digital broadcast wave is modulated using an orthogonal frequency-division multiplexing (OFDM) scheme.

According to the IBOC standard, for example, frequency bands on both upper and lower sides of the analog broadcast wave are used to transmit the digital broadcast wave. A receiving device receives radio waves in a specific frequency band to simultaneously receive the analog broadcast wave and the digital broadcast wave. The analog broadcast wave and the digital broadcast wave transmitted in the same frequency band include the same sound component. The receiving device performs adjustment so as to match the timings of the same sound components in the analog broadcast wave and the digital broadcast wave, and outputs a digital audio of the digital broadcast wave and an analog audio of the analog broadcast wave while switching therebetween. Conventional technologies are described in, for example, International Publication No. 2011/102144.

Since the receiving device outputs the digital audio and the analog audio while switching therebetween, the analog broadcast wave is transmitted from a broadcast station at a time delayed by a preset time with respect to the digital broadcast wave. A configuration is known in which the receiving device includes a plurality of electronic components, and demodulation of the digital broadcast wave and demodulation of the analog broadcast wave are performed in the different electronic components. In such a configuration, processing times of a processing system for the analog broadcasting and a processing system for the digital broadcasting are adjusted to be kept constant, and the analog broadcast wave is delayed by the preset time so as to adjust an output time difference between the digital audio and the analog audio.

When, however, the demodulation of the digital broadcast wave and the demodulation of the analog broadcast wave are performed in the different electronic components, the processing times are difficult to be kept constant. As a result, because of the difference in processing time of the demodulation between the electronic components and a gap in communication timing between the electronic components, the output time difference between the digital audio and the analog audio is difficult to be adjusted in some cases.

The present disclosure provides a receiving device that performs the demodulation of the digital broadcast wave and the demodulation of the analog broadcast wave by using different electronic components, and is capable of easily adjusting the output time difference between the digital audio and the analog audio.

SUMMARY

A receiving device according to the present disclosure includes a first electronic component and a second electronic component. The first electronic component includes: an analog audio demodulator configured to demodulate a received signal including a digital broadcast wave and an analog broadcast wave to output an analog audio, the analog broadcast wave being broadcast later by a preset first delay time than the digital broadcast wave; and a transmitter configured to transmit a communication signal including the analog audio and the received signal to the second electronic component. The second electronic component includes: a receiver configured to receive the communication signal from the transmitter; a digital audio demodulator configured to demodulate the received signal included in the communication signal to output a digital audio; and a selector configured to select at least one of the digital audio and the analog audio as an output sound signal.

DETAILED DESCRIPTION

The following describes embodiments of a receiving device 1 according to the present disclosure with reference to the drawings.

First Embodiment

Figure 1:
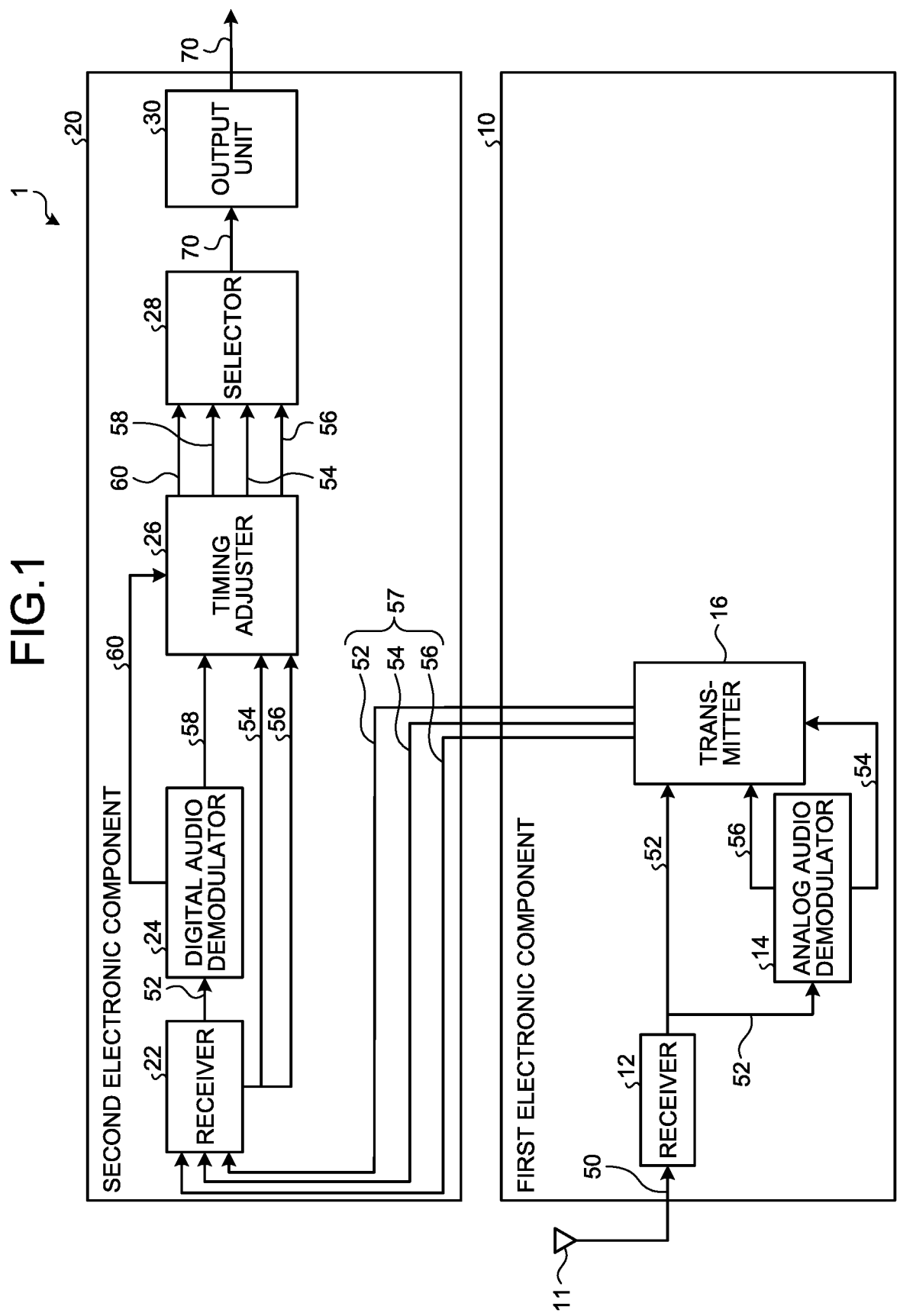
FIG. 1 is a diagram illustrating a configuration of a receiving device according to a first embodiment of the present disclosure.

FIG. 1 is a diagram illustrating a configuration of the receiving device 1 according to a first embodiment of the present disclosure. The receiving device 1 receives and demodulates a radio broadcast wave 50, and outputs an output sound signal 70.

The radio broadcast wave 50 includes an analog broadcast wave and a digital broadcast wave.

The analog broadcast wave is a broadcast wave modulated using an AM scheme or modulated using an FM scheme. The digital broadcast wave is a broadcast wave modulated using an OFDM scheme. In the present embodiment, as an example, a case will be described where the analog broadcast wave and the digital broadcast wave are broadcast waves conforming to the IBOC standard. Therefore, in the present embodiment, the digital broadcast wave is transmitted using frequency bands on both upper and lower sides of the analog broadcast wave. The analog broadcast wave and the digital broadcast wave are not limited to the broadcast waves conforming to the IBOC standard. The analog broadcast wave and the digital broadcast wave may be modulated so as to be located in different frequency bands.

The analog broadcast wave and the digital broadcast wave include the same sound component and are broadcast simultaneously. That is, the analog broadcast wave and the digital broadcast wave are simulcast. In the present embodiment, a broadcast station that transmits the radio broadcast wave 50 broadcasts the analog broadcast wave so as to be delayed by a preset first delay time with respect to the digital broadcast wave. As a result, the analog broadcast wave included in the radio broadcast wave 50 is received by the receiving device 1 later by the above-mentioned first delay time than the same sound component as that included in the digital sound wave. The first delay time is determined in advance based on, for example, a standard on the broadcast station side that distributes the radio broadcast wave 50. The first delay time is, for example, 4.458 seconds, but is not limited to this value.

The receiving device 1 includes a first electronic component 10 and a second electronic component 20. The first electronic component 10 and the second electronic component 20 are connected together so as to be capable of transmitting and receiving signals or data therebetween.

The first electronic component 10 is an electronic component that demodulates the analog broadcast wave. The first electronic component 10 is the electronic component with at least a part thereof configured as a circuit. The entire first electronic component 10 may be configured as software. The first electronic component 10 is, for example, a semiconductor device, such as a semiconductor integrated circuit.

The second electronic component 20 is an electronic component that demodulates the digital broadcast wave. The second electronic component 20 is the electronic component with at least a part thereof configured as a circuit. The entire second electronic component 20 may be configured as software. The second electronic component 20 is, for example, a semiconductor device, such as a semiconductor integrated circuit.

The second electronic component 20 and the first electronic component 10 may be the same electronic component or different electronic components. The second electronic component 20 and the first electronic component 10 preferably differ from each other in at least a part of a configuration of functional units or a circuit configuration for performing processing other than processing related to the demodulation. The term "demodulation" includes herein the demodulation of the analog broadcast wave and the demodulation of the digital broadcast wave.

The first electronic component 10 will first be described. The first electronic component 10 includes an antenna 11, a receiver 12, an analog audio demodulator 14, and a transmitter 16.

At least one of the receiver 12, the analog audio demodulator 14, and the transmitter 16 may be implemented by causing a processor, such as a central processing unit (CPU), to execute a computer program, that is, by software, or may be implemented by hardware. All of the receiver 12, the analog audio demodulator 14, and the transmitter 16 may be implemented by software, or all of them may be implemented by pieces of hardware different from one another. Alternatively, at least one of the receiver 12, the analog audio demodulator 14, and the transmitter 16 may be implemented by software, and the others thereof may be implemented by hardware.

The antenna 11 receives the radio broadcast wave 50. As described above, the radio broadcast wave 50 includes the digital broadcast wave and the analog broadcast wave.

The receiver 12 converts the radio broadcast wave 50 received by the antenna 11 into a received signal 52 serving as a baseband IQ (BBIQ) signal, and outputs the result to the analog audio demodulator 14 and the transmitter 16. The receiver 12 modulates the radio broadcast wave 50 such that the frequency band of the analog broadcast wave included in the radio broadcast wave 50 has a central frequency of 0 Hz and the analog broadcast wave is converted into a signal having a frequency band from 0 Hz to $\pm \alpha$ Hz, whereby the received signal 52 is produced. Herein, $\alpha$ may be set to a value of a frequency of half the total value of the frequency band of the analog broadcast wave and frequency bands of the digital broadcast wave occupying the frequency bands on both upper and lower sides of the analog broadcast wave. For example, $\alpha$ is 200 Hz, but is not limited to this value.

The analog audio demodulator 14 demodulates the received signal 52, and outputs an analog audio 54. The analog audio 54 is digital data that represents a sound obtained by demodulating a signal of the analog broadcast wave included in the received signal 52. The analog audio 54 may be an analog audio signal. For example, the analog audio demodulator 14 amplitude-demodulates or frequency-demodulates the signal of the analog broadcast wave included in the received signal 52, and outputs the analog audio 54. The analog audio demodulator 14 outputs the analog audio 54 to the transmitter 16.

The analog audio demodulator 14 calculates a blend parameter 56. The analog audio demodulator 14 outputs the calculated blend parameter 56 to the transmitter 16.

The blend parameter 56 is information indicating a degree of deterioration by which a digital audio 58 is deteriorated when the analog audio 54 is synthesized with the digital audio 58 on the second electronic component 20 side (to be described later). In other words, the blend parameter 56 is information for processing at least one of the analog audio 54 and the digital audio 58 on the second electronic component 20 side in order to reduce an uncomfortable feel of the output sound when the output sound signal output from the second electronic component 20 (to be described later) is switched between the analog audio 54 and the digital audio 58.

The blend parameter 56 is, for example, a signal-to-noise ratio (S/N), a carrier-to-noise ratio (C/N), or a multipath detection value of the signal of the analog broadcast wave included in the received signal 52. The blend parameter 56 may be a value itself for processing at least one of the analog audio 54 and the digital audio 58 on the second electronic component 20 side. This value is, for example, a value for changing a signal level, a separation ratio of a stereo signal, or a filter coefficient for changing frequency characteristics.

Specifically, the analog audio demodulator 14 compares a signal level of the analog audio 54 with a noise level thereof to calculate the S/N. The analog audio demodulator 14 calculates the C/N based on, for example, a signal spectrum of the signal of the analog broadcast wave included in the received signal 52. The analog audio demodulator 14 calculates the C/N based on, for example, a signal component at the frequency of the signal of the analog broadcast wave included in the received signal 52 and an amount of noise included at frequencies on both sides of the signal component. In the case of the analog broadcast wave, the C/N is correlative with the S/N, so that the S/N can be estimated based on the C/N. The noise of a high-frequency component of a baseband signal of the frequency modulation increases in level when the analog broadcast wave includes multipath. Therefore, the analog audio demodulator 14 calculates the amount of noise of a high-frequency component of the received signal 52 serving as the baseband signal of the frequency modulation as the multipath detection value.

The transmitter 16 transmits a communication signal 57 including the received signal 52 received from the receiver 12, and the analog audio 54 received from the analog audio demodulator 14, to the second electronic component 20. The communication signal 57 only needs to be a signal including at least the received signal 52 and the analog audio 54. The communication signal 57 may include the blend parameter 56. In the present embodiment, as an example, a case will be described where the communication signal 57 is a signal including the received signal 52, the analog audio 54, and the blend parameter 56.

The transmitter 16 is an interface that transmits data. The transmitter 16 operates, for example, in conformity to the Secure Digital Input Output (SDIO) standard, and transmits the communication signal 57 to the second electronic component 20. The transmitter 16 is not limited to the mode of operating in conformity to the SDIO standard.

The following describes the second electronic component 20.

The second electronic component 20 includes a receiver 22, a digital audio demodulator 24, a timing adjuster 26, a selector 28, and an output unit 30. At least one of the receiver 22, the digital audio demodulator 24, the timing adjuster 26, the selector 28, and the output unit 30 may be implemented by causing a processor, such as a CPU, to execute a computer program, that is, by software, or may be implemented by hardware. All of the receiver 22, the digital audio demodulator 24, the timing adjuster 26, the selector 28, and the output unit 30 may be implemented by software, or all of them may be implemented by pieces of hardware different from one another. Alternatively, at least one of the receiver 22, the digital audio demodulator 24, the timing adjuster 26, the selector 28, and the output unit 30 may be implemented by software, and the others thereof may be implemented by hardware.

The receiver 22 is a communication interface that communicates with the transmitter 16 of the first electronic component 10. In other words, the receiver 22 of the second electronic component 20 and the transmitter 16 of the first electronic component 10 form one communication path that transmits and receives data in a one-to-one relation. Therefore, the receiver 22 operates in conformity to the same standard as that of the transmitter 16, and receives the communication signal 57 from the transmitter 16.

The receiver 22 outputs the received signal 52 included in the communication signal 57 received from the transmitter 16 to the digital audio demodulator 24. The receiver 22 outputs the analog audio 54 included in the communication signal 57 received from the transmitter 16 to the timing adjuster 26. If the communication signal 57 includes the blend parameter 56, the receiver 22 may output the blend parameter 56 to the timing adjuster 26.

The digital audio demodulator 24 demodulates the received signal 52, and outputs the digital audio 58. The digital audio 58 is digital data that represents a sound obtained by demodulating a signal of the digital broadcast wave included in the received signal 52. The digital audio 58 may be an audio signal. For example, the digital audio demodulator 24 demodulates the signal of the digital broadcast wave included in the received signal 52 using the OFDM scheme, and outputs the digital audio 58 to the timing adjuster 26.

The digital audio demodulator 24 uses the received signal 52 to generate a switching signal 60, and outputs it to the timing adjuster 26. The switching signal 60 is a signal for switching between a state of selecting the analog audio 54 as the output sound signal 70 and a state of selecting the digital audio 58 as the output sound signal 70. The switching signal 60 is used by the selector 28 to be described later (details will be described later).

For example, when the digital audio 58 has been successfully demodulated, the digital audio demodulator 24 generates the switching signal 60 to switch from the state of selecting the analog audio 54 to the state of selecting the digital audio 58. When the digital audio 58 has failed to be demodulated, the digital audio demodulator 24 generates the switching signal 60 to switch from the state of selecting the digital audio 58 to the state of selecting the analog audio 54.

For example, the digital audio demodulator 24 calculates the C/N ratio based on a signal spectrum of the signal of the digital broadcast wave included in the received signal 52. For example, the digital audio demodulator 24 uses a Viterbi algorithm to decode the data obtained through the demodulation using the OFDM scheme to calculate an error rate as the C/N ratio. For example, the digital audio demodulator 24 compares a signal level of the demodulated digital audio 58 with a noise level thereof to calculate the S/N ratio. The digital audio demodulator 24 only needs to use at least one of the C/N ratio and the S/N ratio to determine a reception state.

The timing adjuster 26 adjusts an output time difference between the digital audio 58 and the analog audio 54 so as to match the timings of the same sound components included in these sound signals.

As described above, the analog broadcast wave included in the radio broadcast wave 50 is broadcast later by the above-described first delay time than the same sound component as that included in the digital sound wave.

The analog audio 54 is a sound signal obtained by being demodulated by the analog audio demodulator 14 of the first electronic component 10. Therefore, the analog audio 54 transmitted from the transmitter 16 through the receiver 22 to the timing adjuster 26 is received by the timing adjuster 26 in a state of being delayed by a second delay time generated by the demodulation of the analog audio 54, in addition to the above-described first delay time. The second delay time is a delay time generated by the demodulation performed by the analog audio demodulator 14 to obtain the analog audio 54. In other words, the second delay time is a delay time generated by the demodulation of the signal of the analog broadcast wave included in the received signal 52 performed by the analog audio demodulator 14.

The digital audio 58 is a sound signal obtained by being demodulated by the digital audio demodulator 24 of the second electronic component 20. Therefore, the digital audio 58 transmitted from the digital audio demodulator 24 to the timing adjuster 26 is received by the timing adjuster 26 in a state of being delayed by a third delay time generated by the demodulation of the digital audio 58. The third delay time is a delay time generated by the demodulation performed by the digital audio demodulator 24 to obtain the digital audio 58. In other words, the third delay time is a delay time generated by the demodulation of the signal of the digital broadcast wave included in the received signal 52 performed by the digital audio demodulator 24.

Accordingly, the timing adjuster 26 delays the digital audio 58 by an adjustment time. The adjustment time is calculated by subtracting the third delay time from the sum of the first delay time and the second delay time. Through this delaying processing, the timing adjuster 26 adjusts the time difference between the digital audio 58 and the analog audio 54 so as to match the timings of the same sound components included in these sound signals.

The timing adjuster 26 may store in advance the first delay time.

The timing adjuster 26 may also store in advance the second delay time. The timing adjuster 26 may use the second delay time stored in advance to adjust the output time difference between the digital audio 58 and the analog audio 54.

The second delay time may vary depending on, for example, the status of processing other than the processing related to the demodulation performed in the first electronic component 10. Therefore, the timing adjuster 26 may receive the second delay time from the transmitter 16 of the first electronic component 10 through the receiver 22. The timing adjuster 26 may use the received second delay time to adjust the timing of the digital audio 58 and the switching signal 60.

In this case, the transmitter 16 of the first electronic component 10 may receive the second delay time generated by the demodulation of the analog audio 54 as well as the analog audio 54 from the analog audio demodulator 14, and the transmitter 16 of the first electronic component 10 may output the second delay time to the second electronic component 20 in a manner included in the communication signal 57. The receiver 22 of the second electronic component 20 may output the analog audio 54, the blend parameter 56, and the second delay time included in the communication signal 57 to the timing adjuster 26.

The timing adjuster 26 may also store in advance the third delay time. The timing adjuster 26 may use the third delay time stored in advance to adjust the output time difference between the digital audio 58 and the analog audio 54.

The third delay time may similarly vary depending on, for example, the status of processing other than the processing related to the demodulation performed in the second electronic component 20. Therefore, the timing adjuster 26 may receive the third delay time generated by the demodulation performed by the digital audio demodulator 24 from the digital audio demodulator 24. In this case, the digital audio demodulator 24 may output the digital audio 58, the third delay time of the digital audio 58, and the switching signal 60 to the timing adjuster 26. The timing adjuster 26 may use the received third delay time to adjust the output time difference between the digital audio 58 and the analog audio 54.

The timing adjuster 26 preferably delays also the switching signal 60 by the length of the above-described adjustment time. This is because the switching signal 60 is a signal generated by the digital audio demodulator 24, and includes the same time difference as that of the digital audio 58.

The selector 28 receives the switching signal 60 delayed by the above-described adjustment time, the digital audio 58 delayed by the above-described adjustment time, the analog audio 54, and the blend parameter 56 from the timing adjuster 26.

The selector 28 selects at least one of the digital audio 58 delayed by the above-described adjustment time and the analog audio 54 as the output sound signal 70, and outputs the selected output sound signal 70 to the output unit 30 (to be described later).

According to the switching signal 60 delayed by the above-described adjustment time, the selector 28 switches from a state of selecting the analog audio 54 to a state of selecting the digital audio 58, or from the state of selecting the digital audio 58 to the state of selecting the analog audio 54.

The selector 28 may select the digital audio 58 delayed by the above-described adjustment time and the analog audio 54 as the output sound signal 70, and output the selected output sound signal 70 to the output unit 30. At that time, the selector 28 may process at least one of the analog audio 54 and the digital audio 58 according to the blend parameter 56.

The selector 28 may spend a predetermined switching time to switch from the digital audio 58 delayed by the above-described adjustment time to the analog audio 54 and to switch from the analog audio 54 to the digital audio 58 delayed by the above-described adjustment time. The switching time is, for example, approximately one second. The selector 28 may use the blend parameter 56 to process at least one of the analog audio 54 and the digital audio 58 during this switching time.

The output unit 30 transmits the output sound signal 70 received from the selector 28 to an external device. The output unit 30 transmits the output sound signal 70 to the external device, for example, through a predetermined digital communication path. The output unit 30 may, for example, convert the output sound signal 70 into an analog audio signal, and transmit it to, for example, an amplifying device for driving a speaker. The output unit 30 may be provided in the first electronic component 10. In this case, the selector 28 only needs to transmit the output sound signal 70 to the output unit 30 of the first electronic component 10 through a communication interface (not illustrated).

In the receiving device 1 configured as described above, the antenna 11 receives the radio broadcast wave 50. The receiver 12 converts the radio broadcast wave 50 received by the antenna 11 into the received signal 52 serving as the BBIQ signal, and outputs the received signal 52 to the analog audio demodulator 14 and the transmitter 16. The analog audio demodulator 14 demodulates the received signal 52 to output the analog audio 54 to the transmitter 16, and calculates the blend parameter 56 to output it to the transmitter 16. The transmitter 16 transmits the communication signal 57 including the received signal 52, the analog audio 54, and the blend parameter 56 to the receiver 22 of the second electronic component 20.

The receiver 22 of the second electronic component 20 outputs the received signal 52 included in the communication signal 57 received from the transmitter 16 of the first electronic component 10 to the digital audio demodulator 24. The receiver 22 also outputs the analog audio 54 and the blend parameter 56 included in the communication signal 57 to the timing adjuster 26.

The digital audio demodulator 24 demodulates the received signal 52, and outputs the digital audio 58 to the timing adjuster 26. The digital audio demodulator 24 uses the received signal 52 to generate the switching signal 60, and outputs it to the timing adjuster 26.

The timing adjuster 26 delays the digital audio 58 and the switching signal 60 by the length of the adjustment time. In the same way as described above, this adjustment time is calculated by subtracting the third delay time from the sum of the first delay time and the second delay time. Through this processing, the timing adjuster 26 adjusts the time difference between the digital audio 58 and the analog audio 54 so as to match the timings of the same sound components included in these sound signals.

The selector 28 selects at least one of the digital audio 58 delayed by the above-described adjustment time and the analog audio 54 as the output sound signal 70. The selected output sound signal 70 is output by the output unit 30 to, for example, the external device or the amplifying device.

As described above, the receiving device 1 of the present embodiment includes the first electronic component 10 and the second electronic component 20. The first electronic component 10 includes the receiver 12, the analog audio demodulator 14, and the transmitter 16. The receiver 12 receives the received signal 52 (radio broadcast wave 50) including the digital broadcast wave and the analog broadcast wave that has been broadcast later by the preset first delay time than the digital broadcast wave. The analog audio demodulator 14 demodulates the received signal 52, and outputs the analog audio 54. The transmitter 16 transmits the communication signal 57 including the analog audio 54 and the received signal 52 to the second electronic component 20.

The second electronic component 20 includes the receiver 22, the digital audio demodulator 24, the timing adjuster 26, and the selector 28. The receiver 22 receives the communication signal 57 from the transmitter 16. The digital audio demodulator 24 demodulates the received signal 52 included in the communication signal 57, and outputs the digital audio 58. The selector 28 selects at least one of the delayed digital audio 58 and the analog audio 54 as the output sound signal 70.

The following assumes a case where, for example, from the viewpoint of cost reduction, system scalability improvement, or the like, the demodulation of the digital broadcast wave and the demodulation of the analog broadcast wave are performed in different electronic components. For example, a case is assumed where the demodulation of the analog broadcast wave is performed in an electronic component such as a dedicated large-scale integrated (LSI) circuit, and the demodulation of the digital broadcast wave is performed in a general-purpose electronic component that also performs processing other than the processing of the radio broadcast wave 50. For example, a case is assumed where the demodulation of the digital broadcast wave is performed in an electronic component that performs processing of general functions, such as image drawing on a screen and reproduction of data stored in a Universal Serial Bus (USB) memory, other than the processing of the radio broadcast wave 50.

When the demodulation of the digital broadcast wave and the demodulation of the analog broadcast wave are performed in the different electronic components as described above, a case is assumed where the processing time of each of the processing system for the analog broadcasting and the processing system for the digital broadcasting is adjusted to be kept constant, and the analog broadcast wave is delayed by a preset time so as to adjust the output time difference between the digital audio and the analog audio.

However, in conventional technologies, when the demodulation of the digital broadcast wave and the demodulation of the analog broadcast wave are performed in the different electronic components, the processing time is difficult to be kept constant, and, because of the difference in processing time of the demodulation between the electronic components and a gap in communication timing between the electronic components, the output time difference between the digital audio and the analog audio is difficult to be adjusted in some cases.

Also, in the conventional technologies, when the received signal 52 including the digital broadcast wave and the analog broadcast wave and the analog audio 54 obtained by the demodulation of the analog broadcast wave are transmitted from one of the electronic components to the other of the electronic components through separate communication paths, it is difficult to adjust the output time difference between the digital audio and the analog audio in the electronic component on the receiving side in some cases.

In the present embodiment, however, the transmitter 16 of the first electronic component 10 transmits the communication signal 57 including the received signal 52 and the analog audio 54 obtained by the demodulation to the receiver 22 of the second electronic component 20. That is, in the present embodiment, the communication signal 57 is transmitted from the first electronic component 10 to the second electronic component 20 through the one communication path formed of a pair of the transmitter 16 of the first electronic component 10 and the receiver 22 of the second electronic component 20.

As a result, in the second electronic component 20, the received signal 52 and the analog audio 54 can be received in the state in which the time difference is fixed.

Accordingly, in the receiving device 1 of the present embodiment that uses the different electronic components to perform the demodulation of the digital broadcast wave and the demodulation of the analog broadcast wave, the output time difference between the digital audio 58 and the analog audio 54 can be easily adjusted.

In the second electronic component 20, the first delay time, the second delay time, and the third delay time are used to adjust the time difference between the analog audio 54 included in the communication signal 57 received by the receiver 22 and the digital audio 58 demodulated from the received signal 52 included in the communication signal 57 so as to match the timings of the same sound components in the analog audio 54 and the digital audio 58.

As a result, in the second electronic component 20, the simple arithmetic processing can adjust the output time difference between the digital audio 58 and the analog audio 54.

The selector 28 uses the switching signal 60 delayed by the above-described adjustment time to switch between the state of selecting the digital audio 58 as the output sound signal 70 and the state of selecting the analog audio 54 as the output sound signal 70, whereby the output time difference can be more accurately adjusted.

Second Embodiment

In a second embodiment of the present disclosure, a configuration of using flags to adjust the output time difference will be described. The same functions and the same components as those of the first embodiment are denoted by the same reference numerals, and detailed description thereof may be omitted.

Figure 2:
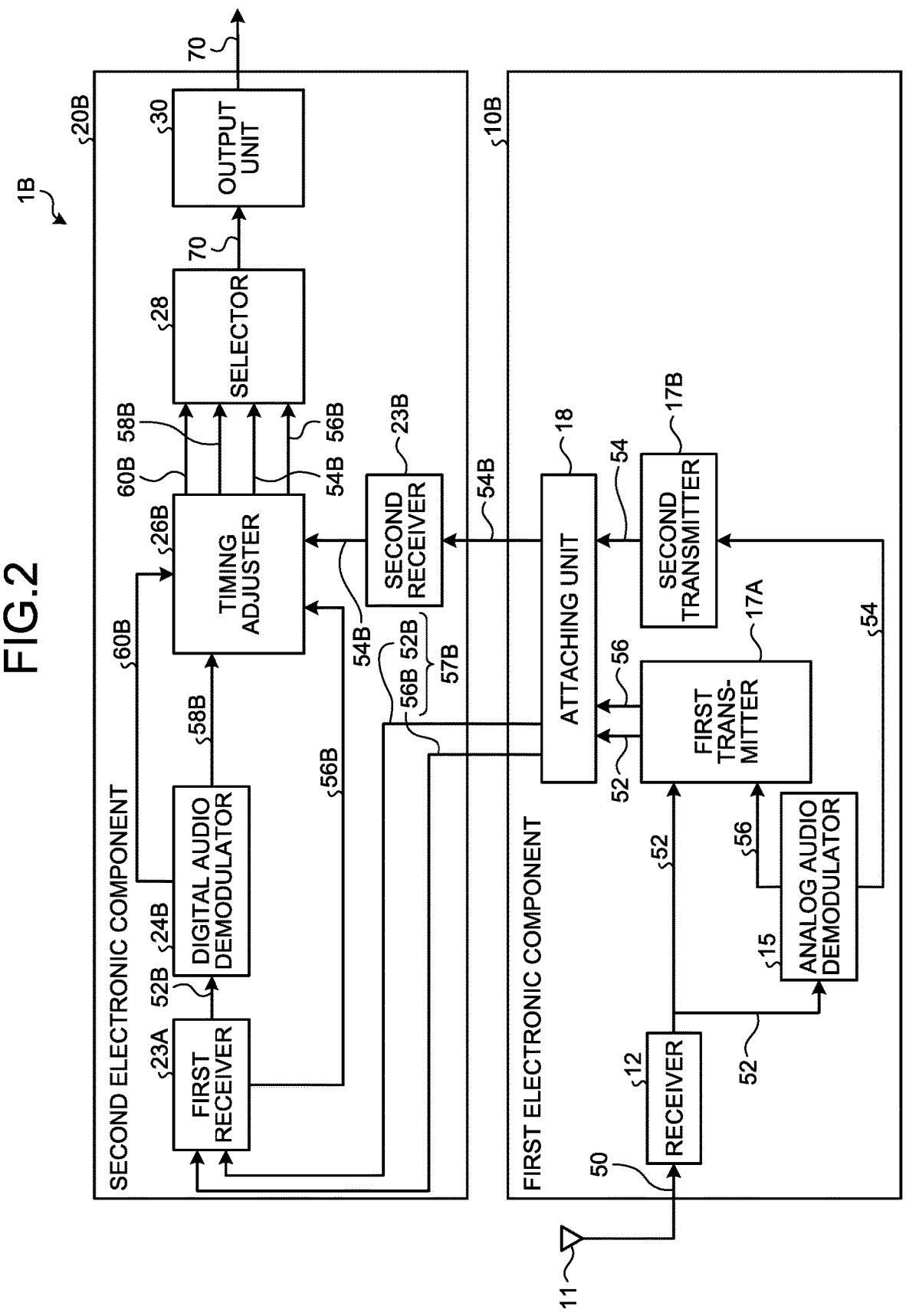
FIG. 2 is a diagram illustrating a configuration of a receiving device according to a second embodiment of the present disclosure.

FIG. 2 is a diagram illustrating a configuration of a receiving device 1B according to the present embodiment. In the same way as the receiving device 1 of the above-described embodiment, the receiving device 1B receives and demodulates the radio broadcast wave 50, and outputs the output sound signal 70.

The receiving device 1B includes a first electronic component 10B and a second electronic component 20B. The first electronic component 10B and the second electronic component 20B are connected together so as to be capable of transmitting and receiving signals or data therebetween.

In the same way as the first electronic component 10 of the above-described first embodiment, the first electronic component 10B is an electronic component that demodulates the analog broadcast wave. In the same way as the second electronic component 20 of the above-described first embodiment, the second electronic component 20B is an electronic component that demodulates the digital broadcast wave. In the same way as the first electronic component 10 and the second electronic component 20 of the above-described embodiment, the first electronic component 10B and the second electronic component 20B may be the same electronic components or different electronic components. The first electronic component 10B and the second electronic component 20B preferably differ from each other in at least a part of a configuration of functional units or a circuit configuration for performing the processing other than the processing related to the demodulation. The term "demodulation" may include herein the analog sound demodulation and the digital sound demodulation.

The first electronic component 10B includes the antenna 11, the receiver 12, an analog audio demodulator 15, a first transmitter 17A, a second transmitter 17B, and an attaching unit 18. At least one of the receiver 12, the analog audio demodulator 15, the first transmitter 17A, the second transmitter 17B, and the attaching unit 18 may be implemented by causing a processor, such as a CPU, to execute a computer program, namely, by software, or may be implemented by hardware. All of the receiver 12, the analog audio demodulator 15, the first transmitter 17A, the second transmitter 17B, and the attaching unit 18 may be implemented by software, or all of them may be implemented by pieces of hardware different from one another. Alternatively, at least one of the receiver 12, the analog audio demodulator 15, the first transmitter 17A, the second transmitter 17B, and the attaching unit 18 may be implemented by software, and the others thereof may be implemented by hardware.

In the same way as the analog audio demodulator 14 of the first embodiment, the analog audio demodulator 15 demodulates the received signal 52, and outputs the analog audio 54. Also in the same way as the analog audio demodulator 14 of the first embodiment, the analog audio demodulator 15 calculates the blend parameter 56.

In the present embodiment, the analog audio demodulator 15 outputs the blend parameter 56 to the first transmitter 17A, and outputs the analog audio 54 to the second transmitter 17B.

The first transmitter 17A is an interface that transmits data. The first transmitter 17A operates, for example, in conformity to the SDIO standard, and transmits the received signal 52 and the blend parameter 56 through the attaching unit 18 to the second electronic component 20B. The first transmitter 17A is not limited to the mode of operating in conformity to the SDIO standard.

The second transmitter 17B is an interface that transmits data. The second transmitter 17B transmits the analog audio 54 through the attaching unit 18 to a second receiver 23B, for example, according to an Inter-IC Sound ($I^2S$) based method. The communication method of the second transmitter 17B is not limited to the $I^2S$-based method.

The attaching unit 18 attaches a flag indicating a timing of transmission to the received signal 52 and the blend parameter 56 received from the first transmitter 17A, and to the analog audio 54 received from the second transmitter 17B.

In detail, the attaching unit 18 attaches a first flag to each of the received signal 52 and the blend parameter 56 received from the first transmitter 17A. The first flag indicates the timing of transmission of the received signal 52 and the blend parameter 56 by the first transmitter 17A. The attaching unit 18 attaches a second flag to the analog audio 54 received from the second transmitter 17B. The second flag indicates the timing of transmission of the analog audio 54 by the second transmitter 17B.

Figure 3:
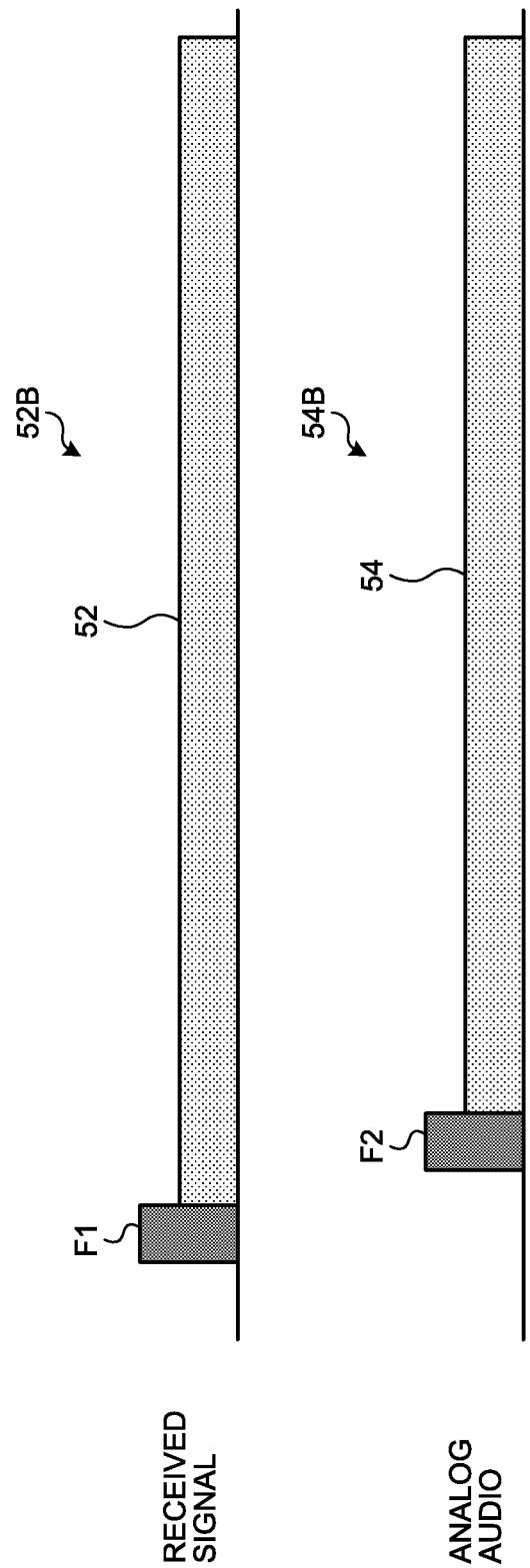
FIG. 3 is a schematic diagram illustrating a received signal and an analog audio according to the second embodiment.

FIG. 3 is a schematic diagram illustrating a received signal 52B and an analog audio 54B. The attaching unit 18 generates the received signal 52B, for example, by attaching a first flag F1 indicating the timing of transmission of a position of a head of the received signal 52 to the head thereof. The attaching unit 18 generates the analog audio 54B, for example, by attaching a second flag F2 indicating the timing of transmission of a position of a head of the analog audio 54 to the head thereof.

The attaching position of each of the first flag F1 and the second flag F2 is not limited to the head of a corresponding one of the received signal 52 and the analog audio 54, and may be any position. In this case, the position to which the flag is attached only needs to be a position matching the timing of transmission of the position. Specifically, the attaching unit 18 may attach the first flag F1 and the second flag F2 to the heads of the received signal 52 and the analog audio 54, respectively, at the times of start of the transmission thereof, or may attach the first flag F1 and the second flag F2 at regular intervals. The term "regular intervals" refers, for example, to intervals of several seconds. The attaching unit 18 may attach each of the first flag F1 and the second flag F2 at a time when a request is received from the second electronic component 20B side.

When the received signal 52B and the analog audio 54B are transmitted to the second electronic component 20B, the attaching unit 18 may use the following method to attach the first flag F1 and the second flag F2.

When the received signal 52B is transmitted to a first receiver 23A (to be described later) of the second electronic component 20B through a communication path between the first transmitter 17A and the first receiver 23A, the attaching unit 18 may attach the first flag F1 to the same communication line in the communication path as a communication line for transmitting the received signal 52B. In the same way, when the analog audio 54B is transmitted to the second receiver 23B (to be described later) of the second electronic component 20B through a communication path between the second transmitter 17B and the second receiver 23B, the attaching unit 18 may attach the second flag F2 to the same communication line in the communication path as a communication line for transmitting the analog audio 54B.

When the first transmitter 17A multiplexes the received signal 52 according to, for example, a time-division multiplexing (TDM) method and transmits the multiplexed signal to the first receiver 23A (to be described later) of the second electronic component 20B, the attaching unit 18 may attach the first flag F1 to a channel other than that of the received signal 52 and transmit the multiplexed signal to the first receiver 23A. In the same way, when the second transmitter 17B multiplexes the analog audio 54 according to, for example, the TDM method and transmits the multiplexed signal to the second receiver 23B (to be described later) of the second electronic component 20B, the attaching unit 18 may attach the second flag F2 to a channel other than that of the analog audio 54 and transmit the multiplexed signal to the second receiver 23B. In this case, the first flag F1 and the second flag F2 can be superimposed on the received signal 52 and the analog audio 54 with the same timing as that of these signals while maintaining the format of each of the received signal 52 and the analog audio 54.

The description will be continued with reference again to FIG. 2. The attaching unit 18 transmits a communication signal 57B including the received signal 52B and a blend parameter 56B obtained by attaching the first flag F1 to the blend parameter 56 to the first receiver 23A of the second electronic component 20B. In the same way, the attaching unit 18 transmits the analog audio 54B to the second receiver 23B of the second electronic component 20B.

The following describes the second electronic component 20B. In the same way as the second electronic component 20 of the first embodiment, the second electronic component 20B is an electronic component that demodulates the digital broadcast wave.

The second electronic component 20B includes the first receiver 23A, the second receiver 23B, a digital audio demodulator 24B, a timing adjuster 26B, the selector 28, and the output unit 30. At least one of the first receiver 23A, the second receiver 23B, the digital audio demodulator 24B, the timing adjuster 26B, the selector 28, and the output unit 30 may be implemented by causing a processor, such as a CPU, to execute a computer program, that is, by software, or may be implemented by hardware. All of the first receiver 23A, the second receiver 23B, the digital audio demodulator 24B, the timing adjuster 26B, the selector 28, and the output unit 30 may be implemented by software, or all of them may be implemented by pieces of hardware different from one another. Alternatively, at least one of the first receiver 23A, the second receiver 23B, the digital audio demodulator 24B, the timing adjuster 26B, the selector 28, and the output unit 30 may be implemented by software, and the others thereof may be implemented by hardware.

The first receiver 23A is a communication interface that communicates with the first transmitter 17A of the first electronic component 10B. In other words, the first receiver 23A of the second electronic component 20B and the first transmitter 17A of the first electronic component 10B form one communication path that transmits and receives data in a one-to-one relation. Therefore, the first receiver 23A operates in conformity to the same standard as that of the first transmitter 17A, and receives the communication signal 57B from the first transmitter 17A through the attaching unit 18.

The first receiver 23A outputs the received signal 52B included in the communication signal 57B to the digital audio demodulator 24B. The first receiver 23A also outputs the blend parameter 56B included in the communication signal 57B to the timing adjuster 26B.

The digital audio demodulator 24B demodulates the received signal 52B, and outputs a digital audio 58B. For example, the digital audio demodulator 24B performs the demodulation in the same way as the digital audio demodulator 24 except for demodulating a sound component portion other than the first flag F1 included in the received signal 52B. The digital audio demodulator 24B attaches the first flag F1 to the digital audio obtained by the demodulation in the same position (that is, the same time position) thereof as that of the first flag F1 in the received signal 52B. The digital audio demodulator 24B outputs the digital audio 58B with the first flag F1 attached thereto. The digital audio 58B output from the digital audio demodulator 24B is supplied to the timing adjuster 26B.

The digital audio demodulator 24B uses the received signal 52B to generate a switching signal 60B, and outputs the switching signal 60B to the timing adjuster 26B. The switching signal 60B is the same signal as the switching signal 60 except for having the first flag F1 attached thereto. The digital audio demodulator 24B only needs to generate the switching signal 60B in the same way as the digital audio demodulator 24 besides attaching the first flag F1 to the same time position as that of the digital audio 58B.

The second receiver 23B is a communication interface that communicates with the second transmitter 17B of the first electronic component 10B. In other words, the second receiver 23B of the second electronic component 20B and the second transmitter 17B of the first electronic component 10B form one communication path that transmits and receives data in a one-to-one relation. Therefore, the second receiver 23B operates in conformity to the same method as that of the second transmitter 17B, and receives the analog audio 54B from the second transmitter 17B through the attaching unit 18. The same method refers, for example, to the I$^2$S-based method.

The second receiver 23B outputs the analog audio 54B received from the second transmitter 17B through the attaching unit 18 to the timing adjuster 26B.

The timing adjuster 26B adjusts the output time difference between the digital audio 58B and the analog audio 54B so as to match the timings of the same sound components included in these sound signals.

In the present embodiment, the timing adjuster 26B further uses the first flag F1 and the second flag F2 to adjust the timing.

In detail, the timing adjuster 26B matches the timing of the first flag F1 attached to the digital audio 58B with the timing of the second flag F2 attached to the analog audio 54B. The timing adjuster 26B also matches the timings after being matched with each other with the timing of the first flag F1 attached to the switching signal 60B.

Then, the timing adjuster 26B delays the digital audio 58B by the length of the adjustment time in the same way as the timing adjuster 26 of the above-described first embodiment. In the same way as described above, this adjustment time is calculated by subtracting the third delay time from the sum of the first delay time and the second delay time. Through this processing, the timing adjuster 26B adjusts the output time difference between the digital audio 58B and the analog audio 54B so as to match the timings of the same sound components included in these sound signals.

The timing adjuster 26B outputs the switching signal 60B, the digital audio 58B, the analog audio 54B, and the blend parameter 56B after being adjusted for the output time difference to the selector 28. At this time, the timing adjuster 26B preferably outputs them to the selector 28 after removing the first flag F1 and the second flag F2 included in each of the signals.

The selector 28 and the output unit 30 are the same as the selector 28 and the output unit 30 of the above-described first embodiment. The selector 28 selects at least one of the digital audio 58B delayed by the above-described adjustment time and the analog audio 54B as the output sound signal 70, and outputs the selected output sound signal 70 to the output unit 30. The output unit 30 transmits the output sound signal 70 received from the selector 28 to the external device.

As described above, the receiving device 1B of the present embodiment includes the two communication paths including the communication path for transmitting the received signal 52B and the communication path for transmitting the analog audio 54B as communication paths between the first electronic component 10B and the second electronic component 20B. The communication path for transmitting the received signal 52B is formed of a pair of the first transmitter 17A and the first receiver 23A. The communication path for transmitting the analog audio 54B is formed of a pair of the second transmitter 17B and the second receiver 23B. The attaching unit 18 attaches the first flag F1 indicating the timing of transmission by the first transmitter 17A to the received signal 52, and attaches the second flag F2 indicating the timing of transmission by the second transmitter 17B to the analog audio 54.

With this configuration, the received signal 52B with the first flag F1 attached thereto and the analog audio 54B with the second flag F2 attached thereto are transmitted from the first electronic component 10B to the second electronic component 20B through the different communication paths. The timing adjuster 26B of the second electronic component 20B can adjust a difference in time of reception on the second electronic component 20B side between the digital audio 58B and the analog audio 54B received from the two respective communication paths by matching the timing of the first flag F1 with the timing of the second flag F2 included in the digital audio 58B and the analog audio 54B.

In the second electronic component 20B, the first delay time, the second delay time, and the third delay time are further used to adjust the time difference between the analog audio 54B and the digital audio 58B after being adjusted for the difference in time of reception using the first flag F1 and the second flag F2.

As a result, in the second electronic component 20B, the simple arithmetic processing can adjust the output time difference between the digital audio 58B and the analog audio 54B.

Accordingly, in the receiving device 1B of the present embodiment that uses the different electronic components to perform the demodulation of the digital broadcast wave and the demodulation of the analog broadcast wave, the output time difference between the digital audio 58B and the analog audio 54B can be easily adjusted.

Third Embodiment

In a third embodiment of the present disclosure, a configuration of using the time of reception on the second electronic component 20B side to adjust the timing will be described. The same functions and the same components as those of the first embodiment or the second embodiment are denoted by the same reference numerals, and detailed description thereof may be omitted.

Figure 4:
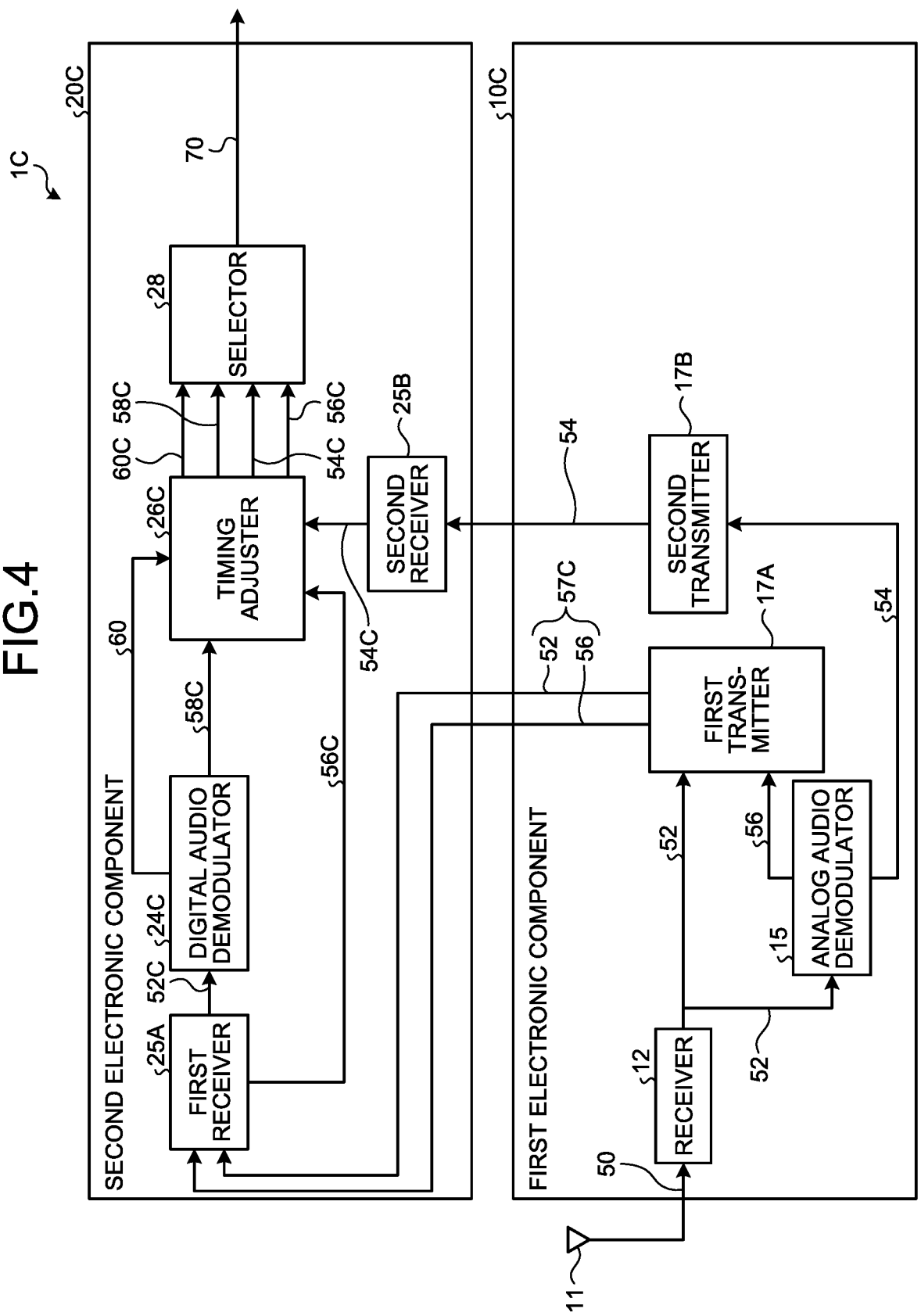
FIG. 4 is a diagram illustrating a configuration of a receiving device according to a third embodiment of the present disclosure.

FIG. 4 is a diagram illustrating a configuration of a receiving device 1C according to the present embodiment. In the same way as the receiving device 1 of the above-described embodiment, the receiving device 1C receives and demodulates the radio broadcast wave 50, and outputs the output sound signal 70.

The receiving device 1C includes a first electronic component 10C and a second electronic component 20C. The first electronic component 10C and the second electronic component 20C are connected together so as to be capable of transmitting and receiving signals or data therebetween.

In the same way as the first electronic component 10 of the above-described first embodiment, the first electronic component 10C is an electronic component that demodulates the analog broadcast wave. In the same way as the second electronic component 20 of the above-described first embodiment, the second electronic component 20C is an electronic component that demodulates the digital broadcast wave. In the same way as the first electronic component 10 and the second electronic component 20 of the above-described embodiment, the first electronic component 10C and the second electronic component 20C may be the same electronic component or different electronic components. The first electronic component 10C and the second electronic component 20C preferably differ from each other in at least a part of a configuration of functional units or a circuit configuration for performing the processing other than the processing related to the demodulation. The term "demodulation" may include herein the analog sound demodulation and the digital sound demodulation.

The first electronic component 10C includes the antenna 11, the receiver 12, the analog audio demodulator 15, the first transmitter 17A, and the second transmitter 17B. The first electronic component 10C is the same as the first electronic component 10B of the second embodiment except for not including the attaching unit 18.

That is, in the present embodiment, the first transmitter 17A transmits the received signal 52 and the blend parameter 56 to the second electronic component 20C. In the present embodiment, the first transmitter 17A transmits a communication signal 57C including the received signal 52 and the blend parameter 56 to a first receiver 25A of the second electronic component 20C.

The second transmitter 17B transmits the analog audio 54 to the second electronic component 20C. In the present embodiment, the second transmitter 17B transmits the analog audio 54 to a second receiver 25B of the second electronic component 20C.

The following describes the second electronic component 20C. In the same way as the second electronic component 20 of the first embodiment, the second electronic component 20C is an electronic component that demodulates the digital broadcast wave.

The second electronic component 20C includes the first receiver 25A, the second receiver 25B, a digital audio demodulator 24C, a timing adjuster 26C, the selector 28, and the output unit 30. At least one of the first receiver 25A, the second receiver 25B, the digital audio demodulator 24C, the timing adjuster 26C, the selector 28, and the output unit 30 may be implemented by causing a processor, such as a CPU, to execute a computer program, that is, by software, or may be implemented by hardware. All of the first receiver 25A, the second receiver 25B, the digital audio demodulator 24C, the timing adjuster 26C, the selector 28, and the output unit 30 may be implemented by software, or all of them may be implemented by pieces of hardware different from one another. Alternatively, at least one of the first receiver 25A, the second receiver 25B, the digital audio demodulator 24C, the timing adjuster 26C, the selector 28, and the output unit 30 may be implemented by software, and the others thereof may be implemented by hardware.

The first receiver 25A is a communication interface that communicates with the first transmitter 17A of the first electronic component 10C. In other words, the first receiver 25A of the second electronic component 20C and the first transmitter 17A of the first electronic component 10C form one communication path that transmits and receives data in a one-to-one relation. Therefore, the first receiver 25A operates in conformity to the same standard as that of the first transmitter 17A (for example, the SDIO standard), and receives the communication signal 57C from the first transmitter 17A.

In the present embodiment, the first receiver 25A attaches first reception time information serving as a time of reception of the received signal 52 by the first receiver 25A to the received signal 52 included in the communication signal 57C received from the first transmitter 17A. The time of reception of the received signal 52 is equal to a time of reception of the communication signal 57C.

The first receiver 25A also attaches the first reception time information serving as a time of reception of the blend parameter 56 by the first receiver 25A to the blend parameter 56 included in the communication signal 57C received from the first transmitter 17A. The time of reception of the blend parameter 56 is equal to the time of reception of the communication signal 57C.

The first receiver 25A outputs a received signal 52C serving as the received signal 52 with the first reception time information attached thereto to the digital audio demodulator 24C. The first receiver 25A also outputs a blend parameter 56C serving as the blend parameter 56 with the first reception time information attached thereto to the timing adjuster 26C.

The digital audio demodulator 24C demodulates the received signal 52C, and outputs a digital audio 58C with the first reception time information attached thereto to the timing adjuster 26C. For example, the digital audio demodulator 24C demodulates the received signal 52C in the same way as the digital audio demodulator 24 except for performing the demodulation using a sound component portion other than the first reception time information included in the received signal 52C. The digital audio demodulator 24C attaches the first reception time information that has been attached to the received signal 52C to the demodulated digital audio, and thus, outputs the digital audio 58C with the first reception time information attached thereto.

The digital audio demodulator 24C uses the received signal 52C to generate a switching signal 60C, and outputs the switching signal 60C to the timing adjuster 26C. The switching signal 60C is the same signal as the switching signal 60 except for having the first reception time information attached thereto. The digital audio demodulator 24C only needs to generate the switching signal 60C in the same way as the digital audio demodulator 24 besides attaching thereto the first reception time information that has been attached to the received signal 52C.

The second receiver 25B is a communication interface that communicates with the second transmitter 17B of the first electronic component 10C. In other words, the second receiver 25B of the second electronic component 20C and the second transmitter 17B of the first electronic component 10C form one communication path that transmits and receives data in a one-to-one relation. Therefore, the second receiver 25B operates in conformity to the same method as that of the second transmitter 17B, and receives the analog audio 54 from the second transmitter 17B.

The second receiver 25B attaches second reception time information serving as a time of reception of the analog audio 54 by the second receiver 25B to the analog audio 54 received from the second transmitter 17B.

The second receiver 25B outputs an analog audio 54C serving as the analog audio 54 with the second reception time information attached thereto to the timing adjuster 26C.

The timing adjuster 26C adjusts the output time difference between the digital audio 58C and the analog audio 54C so as to match the timings of the same sound components included in these sound signals.

In the present embodiment, the timing adjuster 26C uses the first reception time information attached to the digital audio 58C and the second reception time information attached to the analog audio 54C to match the timings of the reception times of the digital audio 58C and the analog audio 54C. The timing adjuster 26C also matches the timings after being matched with each other with the timing of reception represented by the first reception time information attached to the switching signal 60C.

Then, the timing adjuster 26C delays the digital audio 58C by the length of the adjustment time in the same way as the timing adjuster 26 of the above-described first embodiment. In the same way as described above, this adjustment time is calculated by subtracting the third delay time from the sum of the first delay time and the second delay time. Through this processing, the timing adjuster 26C adjusts the output time difference between the digital audio 58C and the analog audio 54C so as to match the timings of the same sound components included in these sound signals.

The timing adjuster 26C outputs the switching signal 60C, the digital audio 58C, the analog audio 54C, and the blend parameter 56C after being adjusted for the timing to the selector 28. At this time, the timing adjuster 26C preferably outputs them to the selector 28 after removing the reception time information, that is, the first reception time information and the second reception time information included in each of the signals.

The selector 28 and the output unit 30 are the same as the selector 28 and the output unit 30 of the above-described first embodiment. The selector 28 selects at least one of the digital audio 58C delayed by the above-described adjustment time and the analog audio 54C as the output sound signal 70, and outputs the selected output sound signal 70 to the output unit 30. The output unit 30 transmits the output sound signal 70 received from the selector 28 to the external device.

As described above, the receiving device 1C of the present embodiment includes the two communication paths including the communication path for transmitting the received signal 52 and the communication path for transmitting the analog audio 54 as communication paths between the first electronic component 10C and the second electronic component 20C. The communication path for transmitting the received signal 52 is formed of a pair of the first transmitter 17A and the first receiver 25A. The communication path for transmitting the analog audio 54 is formed of a pair of the second transmitter 17B and the second receiver 25B. The first receiver 25A attaches the first reception time information representing the time of reception of the received signal 52 to the received signal 52. The second receiver 25B attaches the second reception time information representing the time of reception of the analog audio 54 to the analog audio 54.

With this configuration, the timing adjuster 26C can adjust the difference in time of reception between the first reception time information and the second reception time information on the digital audio 58C and the analog audio 54C received through the two communication paths by matching the timings of reception times of these sound signals.

In the second electronic component 20C, the first delay time, the second delay time, and the third delay time are further used to adjust the time difference between the analog audio 54C and the digital audio 58C after being adjusted for the difference in time of reception using the first reception time information and the second reception time information.

As a result, in the second electronic component 20C, the simple arithmetic processing can adjust the output time difference between the digital audio 58C and the analog audio 54C.

Accordingly, in the receiving device 1C of the present embodiment that uses the different electronic components to perform the demodulation of the digital broadcast wave and the demodulation of the analog broadcast wave, the output time difference between the digital audio 58C and the analog audio 54C can be easily adjusted.

In the receiving device according to the present disclosure that performs the demodulation of the digital broadcast wave and the demodulation of the analog broadcast wave by using the different electronic components, the output time difference between the digital audio and the analog audio can be easily adjusted.

While the embodiments of the present invention have been described, these embodiments have been presented as examples, and are not intended to limit the scope of the invention. These embodiments can be implemented in various other forms, and various omissions, substitutions, and modifications can be made without departing from the spirit of the invention. These embodiments and modifications thereof are included in the scope and spirit of the invention, and are also included in the invention described in the claims and the equivalent scope thereof.

What is claimed is:

1. A receiving device comprising:
a first electronic component; and
a second electronic component,
the first electronic component comprising:
an analog audio demodulator configured to demodulate a received signal including a digital broadcast wave and an analog broadcast wave to output an analog audio, the analog broadcast wave being broadcast later by a preset first delay time than the digital broadcast wave; and
a transmitter configured to transmit a communication signal including the analog audio and the received signal to the second electronic component, and
the second electronic component comprising:
a receiver configured to receive the communication signal from the transmitter;
a digital audio demodulator configured to demodulate the received signal included in the communication signal to output a digital audio; and
a selector configured to select at least one of the digital audio and the analog audio as an output sound signal.

2. The receiving device according to claim 1, wherein
the second electronic component further comprises a timing adjuster configured to delay the digital audio by a length of an adjustment time,
the adjustment time is calculated by subtracting, from a sum of the first delay time and a second delay time generated by demodulation of the analog audio, a third delay time generated by demodulation of the digital audio, and
the selector is configured to select at least one of the delayed digital audio and the analog audio as the output sound signal.

3. The receiving device according to claim 2, wherein
the digital audio demodulator is configured to generate a switching signal based on the received signal,
the timing adjuster is configured to delay the switching signal by the length of the adjustment time, and
the selector is configured to switch between a state of selecting the delayed digital audio as the output sound signal and a state of selecting the analog audio as the output sound signal according to the delayed switching signal.

4. The receiving device according to claim 3, wherein
the analog audio demodulator is configured to derive a blend parameter related to a blend ratio between the digital audio and the analog audio based on the received signal,
the transmitter of the first electronic component is configured to transmit the communication signal including the analog audio, the received signal, and the blend parameter to the second electronic component, and
the selector is configured to select a signal obtained by synthesizing the delayed digital audio and the analog audio at the blend ratio according to the blend parameter as the output sound signal.

5. The receiving device according to claim 2, wherein
the analog audio demodulator is configured to derive a blend parameter related to a blend ratio between the digital audio and the analog audio based on the received signal,
the transmitter of the first electronic component is configured to transmit the communication signal including the analog audio, the received signal, and the blend parameter to the second electronic component, and
the selector is configured to select a signal obtained by synthesizing the delayed digital audio and the analog audio at the blend ratio according to the blend parameter as the output sound signal.

6. The receiving device according to of claim 1, wherein
the analog audio demodulator is configured to derive a blend parameter related to a blend ratio between the digital audio and the analog audio based on the received signal,
the transmitter of the first electronic component is configured to transmit the communication signal including the analog audio, the received signal, and the blend parameter to the second electronic component, and
the selector is configured to select a signal obtained by synthesizing the delayed digital audio and the analog audio at the blend ratio according to the blend parameter as the output sound signal.

7. A receiving device comprising:
a first electronic component; and
a second electronic component,
the first electronic component comprising:
an analog audio demodulator configured to demodulate a received signal including a digital broadcast wave and an analog broadcast wave to output an analog audio, the analog broadcast wave being broadcast later by a preset first delay time than the digital broadcast wave;
a first transmitter configured to transmit the received signal to the second electronic component;
a second transmitter configured to transmit the analog audio to the second electronic component; and
an attaching unit configured to attach a first flag indicating a timing of transmission by the first transmitter to the received signal, and attach a second flag indicating a timing of transmission by the second transmitter to the analog audio, and
the second electronic component comprising:
a first receiver configured to receive the received signal with the first flag attached thereto from the first transmitter through the attaching unit;
a second receiver configured to receive the analog audio with the second flag attached thereto from the second transmitter through the attaching unit;
a digital audio demodulator configured to demodulate the received signal with the first flag attached thereto, and to output a digital audio with the first flag attached thereto;
a timing adjuster configured to match the timing of the first flag attached to the digital audio with the timing of the second flag attached to the analog audio, and then to delay the digital audio by a length of an adjustment time; and a selector configured to select at least one of the delayed digital audio and the analog audio as an output sound signal, wherein
the adjustment time is calculated by subtracting, from a sum of the first delay time and a second delay time generated by demodulation of the analog audio, a third delay time generated by demodulation of the digital audio.

8. The receiving device according to claim 7, wherein
the digital audio demodulator is configured to generate a switching signal based on the received signal,
the timing adjuster is configured to delay the switching signal by the length of the adjustment time, and
the selector is configured to switch between a state of selecting the delayed digital audio as the output sound signal and a state of selecting the analog audio as the output sound signal according to the delayed switching signal.

9. The receiving device according to claim 8, wherein
the analog audio demodulator is configured to derive a blend parameter related to a blend ratio between the digital audio and the analog audio based on the received signal,
the first transmitter of the first electronic component is configured to transmit the received signal and the blend parameter to the second electronic component,
the second transmitter of the first electronic component is configured to transmit the analog audio to the second electronic component, and
the selector is configured to select a signal obtained by synthesizing the delayed digital audio and the analog audio at the blend ratio according to the blend parameter as the output sound signal.

10. The receiving device according to claim 7, wherein
the analog audio demodulator is configured to derive a blend parameter related to a blend ratio between the digital audio and the analog audio based on the received signal,
the first transmitter of the first electronic component is configured to transmit the received signal and the blend parameter to the second electronic component,
the second transmitter of the first electronic component is configured to transmit the analog audio to the second electronic component, and
the selector is configured to select a signal obtained by synthesizing the delayed digital audio and the analog audio at the blend ratio according to the blend parameter as the output sound signal.

11. A receiving device comprising:
a first electronic component; and
a second electronic component,
the first electronic component comprising:
an analog audio demodulator configured to demodulate a received signal including a digital broadcast wave and an analog broadcast wave to output an analog audio, the analog broadcast wave being broadcast later by a preset first delay time than the digital broadcast wave;
a first transmitter configured to transmit the received signal to the second electronic component; and
a second transmitter configured to transmit the analog audio to the second electronic component, and
the second electronic component comprising:
a first receiver configured to receive the received signal from the first transmitter, and attach thereto first reception time information;
a second receiver configured to receive the analog audio from the second transmitter, and attach thereto second reception time information;
a digital audio demodulator configured to demodulate the received signal with the first reception time information attached thereto, and to output a digital audio with the first reception time information attached thereto;
a timing adjuster configured to match timings of reception times with each other by using the first reception time information attached to the digital audio and the second reception time information attached to the analog audio, and then to delay the digital audio by a length of an adjustment time; and
a selector configured to select at least one of the delayed digital audio and the analog audio as an output sound signal, wherein
the adjustment time is calculated by subtracting, from a sum of the first delay time and a second delay time generated by demodulation of the analog audio, a third delay time generated by demodulation of the digital audio.

12. The receiving device according to claim 11, wherein
the digital audio demodulator is configured to generate a switching signal based on the received signal,
the timing adjuster is configured to delay the switching signal by the length of the adjustment time, and
the selector is configured to switch between a state of selecting the delayed digital audio as the output sound signal and a state of selecting the analog audio as the output sound signal according to the delayed switching signal.

13. The receiving device according to claim 11, wherein
the analog audio demodulator is configured to derive a blend parameter related to a blend ratio between the digital audio and the analog audio based on the received signal,
the first transmitter of the first electronic component is configured to transmit the received signal and the blend parameter to the second electronic component,
the second transmitter of the first electronic component is configured to transmit the analog audio to the second electronic component, and
the selector is configured to select a signal obtained by synthesizing the delayed digital audio and the analog audio at the blend ratio according to the blend parameter as the output sound signal.

14. The receiving device according to claim 12, wherein
the analog audio demodulator is configured to derive a blend parameter related to a blend ratio between the digital audio and the analog audio based on the received signal,
the first transmitter of the first electronic component is configured to transmit the received signal and the blend parameter to the second electronic component,
the second transmitter of the first electronic component is configured to transmit the analog audio to the second electronic component, and
the selector is configured to select a signal obtained by synthesizing the delayed digital audio and the analog audio at the blend ratio according to the blend parameter as the output sound signal.

* * * * *